United States Patent [19]

Bretfeld et al.

[11] Patent Number: 5,253,895
[45] Date of Patent: Oct. 19, 1993

[54] GAS GENERATOR, WITH SAFETY DEVICE, FOR AN AIR BAG

[75] Inventors: Anton Bretfeld, Furth; Josef Kraft, Berg, both of Fed. Rep. of Germany

[73] Assignee: Dynamit Nobel Aktiengesellschaft, Troisdorf, Fed. Rep. of Germany

[21] Appl. No.: 799,951

[22] Filed: Nov. 29, 1991

[30] Foreign Application Priority Data

Nov. 28, 1990 [DE] Fed. Rep. of Germany ....... 4037769

[51] Int. Cl.⁵ .............................................. B60R 21/26
[52] U.S. Cl. ..................................... 280/736; 280/741
[58] Field of Search ............... 280/736, 735, 741, 743; 102/530, 531, 481

[56] References Cited

U.S. PATENT DOCUMENTS

| | | | |
|---|---|---|---|
| 4,005,876 | 2/1977 | Jorgensen et al. | 280/741 |
| 4,084,512 | 4/1978 | San Miguel | 102/103 |
| 4,561,675 | 12/1985 | Adams et al. | 280/736 |
| 4,858,951 | 8/1989 | Lenzen | 280/741 |
| 4,927,175 | 5/1990 | Fohl | 280/806 |
| 4,944,528 | 7/1990 | Nilsson et al. | 280/741 |
| 5,000,479 | 3/1991 | Werner et al. | 280/736 |
| 5,100,174 | 3/1992 | Jasken et al. | 280/736 |

FOREIGN PATENT DOCUMENTS

| | | |
|---|---|---|
| 3824469 | 1/1990 | Fed. Rep. of Germany . |
| 4001864 | 8/1990 | Fed. Rep. of Germany . |
| 3914690 | 9/1990 | Fed. Rep. of Germany . |

Primary Examiner—Margaret A. Focarino
Assistant Examiner—Paul Dickson
Attorney, Agent, or Firm—Antonelli, Terry, Stout & Kraus

[57] ABSTRACT

The gas generator has a cylindrical housing, the front ends of which are closed by closure covers. A cylindrical outer section of the housing consists of high-grade steel; whereas the closure covers are made of aluminum, which has a thermal conductivity which is greater many times greater than that of the high-grade steel. In at least one of the closure covers, there is inserted a self-ignition device, which is provided with an ignitable material, that automatically ignites when reaching a minimum temperature. This minimum temperature clearly lies below the self-ignition temperature of the pressure gas-generating charge contained within the gas generator. The poor thermal conductivity in the cylindrical section of the housing prevents heat transport or transfer from outside via the housing to the pressure gas-generating charge; whereas the good thermal conductivity of the closure covers allows the quick heat transport to the self-ignition device.

13 Claims, 2 Drawing Sheets

GAS GENERATOR, WITH SAFETY DEVICE, FOR AN AIR BAG

BACKGROUND OF THE INVENTION

This invention relates to a gas generator, in particular a tubular gas generator for an air bag, with a housing for accepting a gas-producing material and at least one safety self-ignition device for igniting the gas-producing material at a predetermined minimum temperature of the housing which is secured to the housing in a particularly effective heat-conducting manner.

A gas generator containing self-igniting material is disclosed in DE-39 14 690 C2. The housing of this gas generator consists of two tubes (outer and inner tube), fitted into one another, which are radially spaced from one another. The outer tube is closed in a gas-tight manner on its front ends by substantially disc-shaped closure covers. The inner tube surrounds a gas-producing material (pressure gas-generating charge), which is ignited by an electric ignition device. The electric ignition device is secured to one of the two closure covers. The ignition device is provided with an ignition charge, which is ignited electrically and ignites, for its part, the gas-producing material. The ignition charge is admixed and is a self-igniting material, which ignites when reaching a certain minimum temperature. This minimum temperature lies well below the self-igniting temperature of the pressure gas-generating charge. The self-igniting material has the function of a thermal safety means for the gas generator. In the event of a fire (for example a vehicle fire) or in the event of a fire during storage and transport of the tubular gas generator, this is heated. With the heating, the mechanical properties of the housing deteriorate, said housing no longer having the pressure stability required against bursting apart with high temperatures. Because of the heating of the housing (tubes and closure covers) the ignition device also warms up and the self-igniting material, accommodated therein ignites the gas-producing material when reaching its self-igniting temperature, at which the mechanical properties of the housing are still sufficiently good. The entire housing of the known gas generator consists of aluminum. Aluminum has a relatively high thermal conductivity. Because of this high thermal conductivity there is the danger that the gas-producing material greatly heats via the gas generator housing, so that when igniting such a strong gas formation occurs that the housing bursts.

SUMMARY OF THE INVENTION

The primary object of the invention is to create a gas generator of the safety equipped type, the gas-producing material of which (pressure gas-generating charge) is protected reliably relative to external thermal influences via the housing, so that a thermal safety means responds when there is an increase in temperature of the housing, before the gas-producing material has reached a temperature which is too high.

In order to achieve this object it is provided, according to the invention, that the housing consists only in the region of a self-ignition device of a first material with a high thermal conductivity and otherwise of a second material with a substantially lower thermal conductivity, relative to that of the first material.

According to the invention the housing of the gas generator consists of two types of materials, each of a different thermal conductivity. The major part of the housing consists in this case of a (second) material, which has a relatively low thermal conductivity. High-grade steel is a material which is considered to be particularly effective for this purpose. The region of the housing in which the self-ignition device is secured, consists of a (first) material, the thermal conductivity of which is higher many times over than that of the second material. The housing acts in the region in which it consists of the second material, like a heat insulator, which shields the gas-producing material against external thermal influences. only in a very small region of the housing is the thermal conductivity thereof extremely good. With a heating of the housing, for example in the event of fire, the warmth (heat) is passed on quickly to the self-ignition device, which is in heat-conducting contact with the first material of the housing. Because of the locally different thermal conductivity properties of the housing, which in the region of the self-ignition device has its greatest thermal conductivity, the result is that, with heating of the housing, the self-ignition device reaches in each case its self-igniting temperature, before the gas-producing material has reached its self-igniting temperature or a temperature which is too high. Thus it is guaranteed that the thermal safety means of the gas generator, according to the invention, always responds reliably, i.e. before the possibility of the gas formation of the pressure gas-generating charge has become too great.

Advantageously the thermal conductivity of the first material is 10 times to 20 times that of the second material. This is, for example, achieved in that the first material is aluminum; whereas the second material is high-grade steel, e.g. 1.4301 according to DIN 17440 (stainless steel).

In order to protect the gas-producing material in a good conducting region or section of the housing relative to heat transferred via the housing, according to an advantageous further embodiment of the invention, it is provided that the housing has on its inner side in the region of the self-ignition device, a thermal insulation which covers the housing region or housing section, consisting of the first material, without the gas-producing material being shielded against the self-ignition device. The thermal insulation layer, which does not cover the self-ignition device, contributes to an additional concentration of the heat transport in the housing section which is a good conductor of heat, in the direction of the self-ignition device. Thus the thermal safety means of the gas generator, according to the invention, responds even more quickly, i.e. the self-ignition device responds even more quickly when the housing heats up beyond the ignition temperature of the self-ignition device.

The housing is preferably provided with a cylindrical (high-grade steel) outer tube, consisting of the second material, both front ends of which are closed by closure covers, at least one of which is made of the first material (aluminum), with the self-ignition device being secured to this closure cover. The self-ignition device, which preferably has a substantially cylindrical shape, is integrated in a force-locking and form-locking manner with the closure cover. The connection between the self-ignition device and the closure cover occurs advantageously by screwing or threading together both parts or by a press fit between the self-ignition device and the closure cover. With these types of connection a good heat-conducting contact is created between the self-ignition device and the closure cover, i.e. the housing section with good heat-conducting properties.

In an advantageous further embodiment of the invention it is provided that both closure covers consist of the good heat-conducting first material, for example aluminum, and secured to each closure cover there is an self-ignition device, which is in heat-conducting contact with the closure cover. In this way it is achieved that the thermal safety means of the gas generator, when heating its housing, still responds if the gas generator heats up mainly at one of its ends.

According to a further advantageous feature of the invention, the self-ignition device has a substantially cylindrical housing of heat-conducting material, which is arranged in a centrally arranged through-bore in the closure cover and has a blind hole, open to the pressure gas-generating charge, in which there is accommodated a material which is self-igniting at a minimum temperature (for example based on nitrocellulose). Preferably the blind hole opening is formed as a nozzle, through which, when igniting the self-igniting material, a concentrated, "Jet of flame" penetrating the gas-producing material is formed.

Advantageously, the self-igniting material is present in the blind hole as a homogeneous pressed body, which is covered relative to the blind hole opening by a (lead-tin) foil, wherein the edge is closed, after installing the foil, with a suitable varnish. The covering foil protects the self-igniting material during storage, transport and installation of the self-ignition device in the gas generator, against cracking and from environmental influences.

According to a further advantageous feature of the invention the ignition of the self-igniting material is increased by a booster charge, the ignition of which is initiated by the self-igniting material. The self-igniting material is preferably arranged in the base region of the blind hole, and is, therefore, located in the section of the housing wall or of the closure cover, facing the outer side, at an exposed point. In this way it is guaranteed that the self-igniting material, when there is a strong external influence of heat, heats to the self-igniting temperature. Because of the boosting of the ignition flame as a result of the ignition of the booster charge (boron potassium nitrate) the quantity required of self-igniting material, which is generally a material based on nitrocellulose, need only be relatively small. This has the advantage of a quick heating (low heat discharge because of the small quantity) and moreover the advantage that the quantity of Co gases with combustion of the self-igniting material is also only small. If the self-ignition device were to have nitrocellulose material exclusively as combustion material, this quantity would have to be relatively large, in order to ignite reliably the pressure gas-generating charge. Also with regard to this it is advantageous to use a booster charge.

The housing of the self-ignition device preferably extends in the axial extent of the outer tube over and beyond a closure cover. This extension in the form of an axial bolt, provides a region in which the housing is massive and thus stable and can have, for example, a thread, in order to be able to secure the gas generator, for example, in the vehicle. The housing consists preferably of aluminum or of an aluminum alloy.

SUMMARY OF THE INVENTION

In the following detailed description, embodiments of the invention will be explained with reference to the accompanying drawings, wherein.

DETAILED DESCRIPTION OF THE INVENTION

Figure 1:
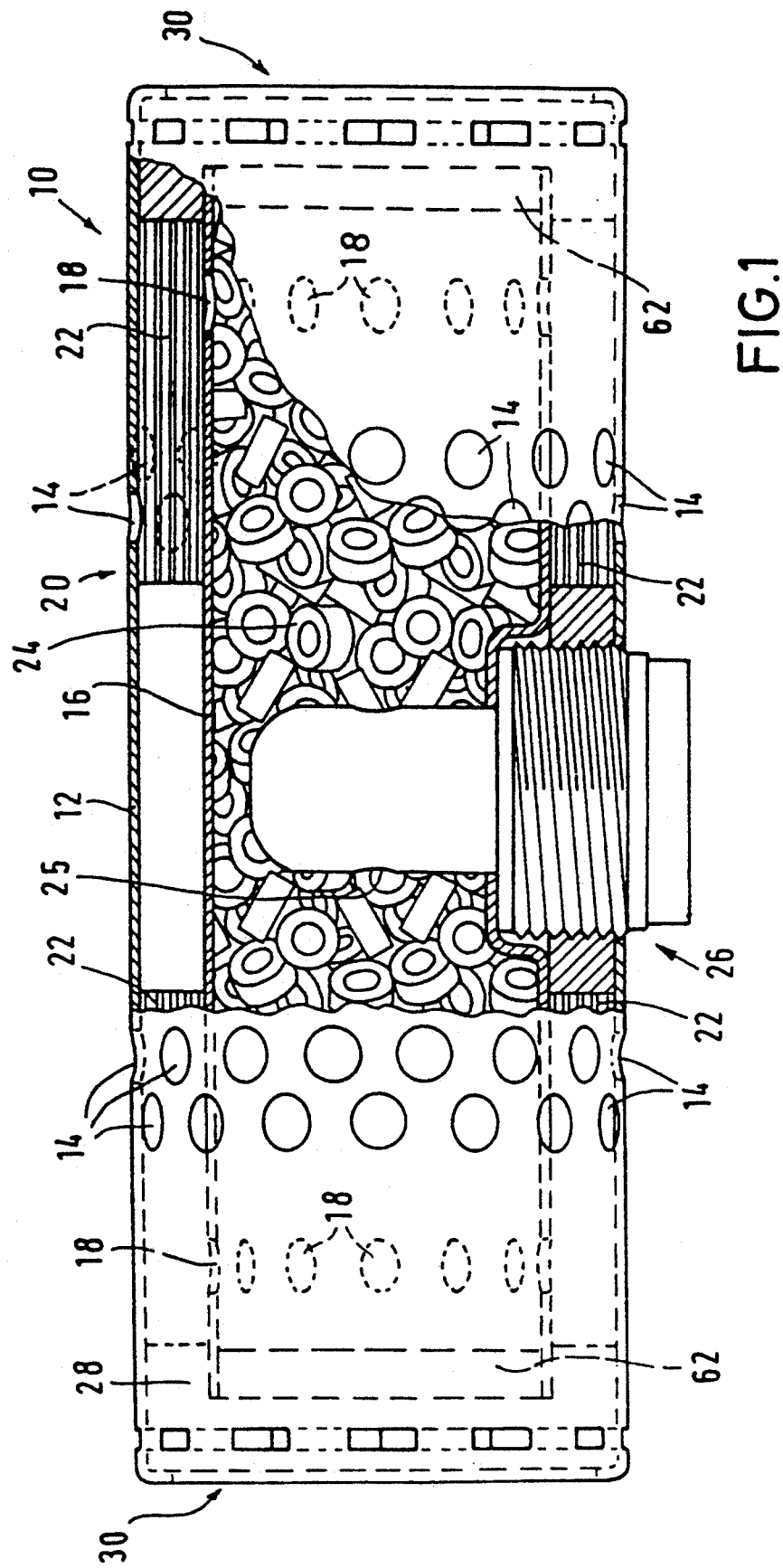
FIG. 1 shows a side view of a tubular gas generator of the invention, partially in section, with a central region being shown in a longitudinal section.

FIG. 1 shows a tubular gas generator 10, in particular for an air bag of a motor vehicle. The tubular gas generator 10 has a high-grade steel outer tube 12, in the wall of which there are formed several gas outlet openings 14. The gas outlet openings 14 are evenly distributed over four peripherally arranged rows on the outer tube 12. The gas outlet openings 14 are located substantially in the central section or region of the outer tube 12, when viewed in the axial longitudinal extent of the tubular gas generator. Within the outer tube 12 there is positioned a high-grade steel inner tube 16, arranged coaxially with the outer tube. In the axial end sections of the wall of the inner tube 16 there are also formed gas outlet openings 18. These gas outlet openings 18 are distributed evenly over two peripheral rows in a region at end sections of the inner tube 16. Between the gas outlet openings 14 of the outer tube 12 and the gas outlet openings 18 of the inner tube 16 there is an axial spacing.

The outer diameter of the inner tube 16 is smaller than the inner diameter of the outer tube 12, so that an annular intermediate chamber 20 is formed between the outer and the inner tubes 12, 16. This annular intermediate chamber 20 is filled in a region extending between the gas outlet openings 14, 18 of both tubes 12, 16 by metal filters packs 22 (formed of high-grade steel wire netting mats).

The inner tube 16 is filled or occupied by gas-producing material based on sodium azide, which produces pressure gas during combustion. The gas-producing material, also called "a pressure gas-generating charge", is present in the form of so-called pellets 24, which are distributed randomly within the inner tube 16. An electrically actuated ignition unit 26 for igniting the pressure gas-generating charge is secured to both tubes 12, 16 and extends through an opening in the inner tube 16 and partially into the inner tube.

The gas generator 10 is closed on the front ends 30 of the outer tube 12 by disc-like closure covers 28. At the ends of the inner tube 16 there are compressible disc elements having spring-elastic properties and made of ceramic felt or ceramic fabric 62, which are supported, on the one hand, against the pellets 24 and, on the other hand, against the inner surfaces of the closure covers 28, wherein these elements hold the pellets 24 together with spring force. The elastic disc elements 62 have the object of evening-out the filling capacity tolerances of the inner tube 16 and then of holding the pellets 24 together, even if the inner tube 16 is not completely filled up with gas-producing material or, in the course of time, the packing density of the pellet 24 increases because of vibrations. The closure covers 28 consist of aluminum and also hold or position the inner tube 16 in a manner which will be hereinafter described in greater detail.

The operation of the gas generator 10 shown in FIG. 1 is as follows: The electrically actuated ignition unit 26, which, in this embodiment, is a so-called layer bridge igniter with primer material, is ignited by a defined electric pulse from an outer side source located in the vehicle and not shown. With the use of the tubular gas generator according to FIG. 1 as a pressure gas generator in a vehicle air bag, this electric pulse, for example, is applied at the ignition unit 26 by closing an inertia switch, in the event of collision of the motor vehicle with another object. In the ignition unit 26 a so-called booster charge is ignited; the ignition vapors produced in this process (flames, gas, hot combustion products) arrive, via openings 25 provided in the housing of the ignition device 26, in the inner chamber of the inner tube 16, where the vapors ignite the pellets 24 evenly and simultaneously. In the inner tube 16, depending on the application, a varying quantity of gas-producing material is converted into gas with a pressure of approx. 200 bar. The hot gases, which consist of approx. 95% nitrogen, arrive via the gas outlet openings 18 at the ends of the inner tube 16, and from this, at the filter packs 22. The filter packs 22 have the object of cooling the gases and cleaning or removing particles (solid matter) and condensates. The gases cooled and cleaned in this manner emerge via the gas outlet openings 14 in the outer tube 12. The gas generator 10 described here produces in a time of approximately 30 milliseconds, in a test volume of 60 dm$^3$, a gas pressure of approximately 3 bar.

Figure 2:
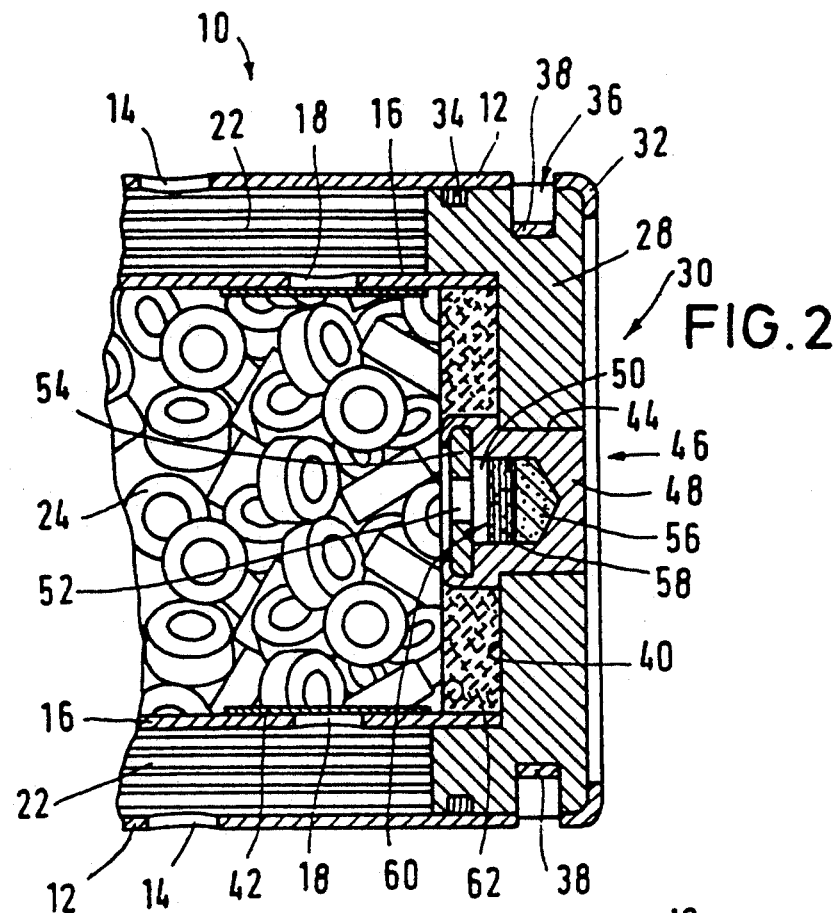
FIG. 2 shows in longitudinal cross-sectional view of one of the two axial end sections of the gas generator with a safety self-ignition device arranged in a closure cover.
Figure 3:
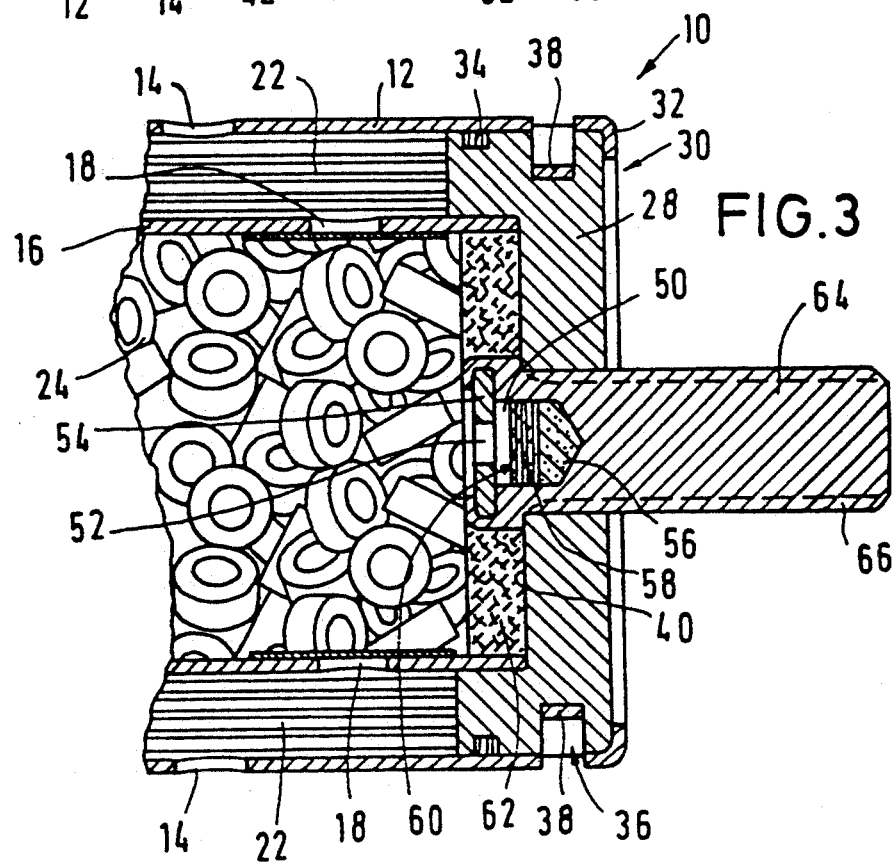
FIG. 3 is a longitudinal cross-sectional view as FIG. 2, wherein the housing of the safety self-ignition device differs from that shown in FIG. 2 and extends in the axial direction over the closure cover.

In the following description reference is made to FIGS. 2 and 3, wherein the positioning of the inner tube 16 within the closure covers 28 of the outer tube 12 and the arrangement of a thermal safety self-ignition device in the closure covers 28 are shown in detail. As can be seen in FIGS. 2 and 3, the closure cover 28 is surrounded on the front end 30 by the outer tube 12. The end of the outer tube 12 projecting in the axial direction over the closure cover 28 is flanged, which is indicated by 32. For lateral sealing of the closure cover 28 relative to the inner surface of the outer tube 12 there is provided a sealing ring 34. Furthermore the closure cover 28 has a peripheral groove 36, in which engage inwardly directed inner projections 38 of the outer tube 12. The inner projections 38 are formed for example by multiple notching of the outer tube 12; i.e. projections 38 comprise inwardly notched portions of the tube 12.

On the inner side facing the front end of the inner tube 16, the closure cover 28 is provided with a central circular recess 40. The end section of the inner tube 16 projects or extends into the recess 40. This end section is easily inserted in a clamping manner into the recess 40 without radial play. In the region of the gas outlet openings 18 there lies on the inner side of the inner tube 16 a gas tight metallic foil 42 which is capable of being destroyed when igniting the pressure gas-generating charge; this foil prevents penetration of the pellets 24 into the gas outlet openings 18 and wear or damages of the pellets 24, as well as providing protection against humidity for the pressure gas-generating charge.

In the closure cover 28 there is formed a centrally arranged through-bore 44, into which a (safety) self-ignition device 46 is inserted. The self-ignition device 46 has a cylindrical housing body 48, which fits on the front end 30 of the gas generator 10, flush with the end surface of the closure cover 28, and projects inwardly over the base of the recess 40. In this projecting region the housing body 48 is widened; by way of the outer annular projection formed by the widened portion, the housing body 48 is supported against the closure cover 28. The housing body 48 is pressed, by means of a press fit, into the centrally arranged through-bore 44 of the closure cover 28.

An axial blind hole 50 is formed into the cylindrical housing body 48; the hole 50 is open to the inner tube 16, and therefore to the gas-producing material. An opening 52 is formed by an annular disc 54, which is surrounded on its periphery by an end section of the housing body 48 extending into the inner tube 16. This end section of the housing body 48 is flanged around the annular disc 54, which disc is firmly connected in this manner to the housing body 48.

The blind hole 50 is partially filled with a material which starts to burn at a fixed temperature. The material is built up in two layers, wherein the first material layer 56 (the actual self-igniting material) is arranged in the region of the base of the blind hole 50 and by a second material layer 58 (a booster charge). on the surface of the second material layer 58 there lies a protective foil 60. The end of the housing body 48 projecting inwards over the base of the recess 40 is surrounded by the ceramic felt or ceramic fabric 62, which rests on the inner side of the closure cover 28 and almost completely occupies the recess 40. As a result of its structure the ceramic felt or ceramic fabric 62 has spring-elastic properties, because of which the fabric 62 presses against the pellets 24 and holds the pellet together.

The operation of the thermal safety means of the gas generator 10 which is in the form of the self-ignition device 46 is described briefly as follows: When the gas generator 10 is heated, for example in the event of a fire, the gas generator housing consisting of the tubes 12, 16 and the closure covers 28 heats up. Since the material (high-grade steel) of the tubes 12, 16 only allows a poor heat conduction, the gas generator 10 is insulated well in its cylindrical housing region (tubes 12, 16); the external heat is not transferred or hardly transferred via the tubes 12, 16 to the pellets 24. The position is different at the closure covers 28, which consist of aluminum, and which is, therefore, of a material with a thermal conductivity that is greater by approximately 15 times, relative to high-grade steel, (the thermal conductivity of aluminum is approximately 204 W/mK; whereas the thermal conductivity of high-grade steel is approximately 14 W/mK). The external heat is passed on, therefore, easily and quickly by way of the closure covers 28 to the housing body 48 of the self-ignition device 46. It should be noted here that the housing body 48 itself closes with one of its front side ends, flush with the closure cover 28, i.e. it is directly exposed to the heat generated by the fire. The housing body 48 itself also consists of a material (aluminum) which is a good conductor of heat. Through the ceramic felt or ceramic fabric 62, on the inner side of each closure cover 28, heat discharge from the closure cover to the pellets 24 is prevented and therefore their self-ignition. The ceramic felt or ceramic fabric 62 must, however, not necessarily be present, since the thermal safety means has responded in each case, because of the extremely good heat conduction in the closure covers 28, before the pressure gas-generating charge has heated to its self-igniting temperature.

Because of the choice of combustible material in the housing body 48, the first material layer 56 has a lower self-igniting temperature than the second material layer 58 and a substantially lower self-igniting temperature than the pellets 24. With a housing body 48 which is being heated, the material of the first material layer 56 ignites when reaching its self-igniting temperature. Through the burning of this material the second material layer 58 is ignited; the material of the first material layer 56 could be called a primer ignition material and the material of the second layer 58, an ignition booster and ignition aid for reliable ignition of the pellets 24. Through the combustion of the second material layer the gas-producing material (the actual gas-forming charge of the gas generator 10) is ignited. At this point in time the generator 10 still has such a low temperature, that the mechanical stability of the tubes 12, 16 and the closure covers 28 prevents the gas generator 10 from bursting. Furthermore the heating of the pellets 24 at the point in time of self-ignition of the self-ignition device 46 is so low that the gas formation thereof is so low that the housing of the gas generator 10 is still not in danger of bursting.

The embodiment shown in FIG. 3 corresponds substantially to that in FIG. 2 with the exception that the housing body (given reference number 64 in FIG. 3) projects in a bolt- or pin-shaped manner outwards over the front end 30 of the gas generator 10. The housing body 64 is provided with an outer thread, which is indicated by 66. The housing body 64 is threaded together with the closure cover 28, for which the installation through-bore 44 of the closure cover 28 is provided with an inner thread. Otherwise the construction of the self-ignition device 46 according to FIG. 3 is the same as that represented in FIG. 2 and described heretofore.

What is claimed is:

1. A gas generator for an air bag comprising:
a housing for containing a gas-producing material and a self-ignition device for igniting the gas-producing material at a predetermined minimum temperature of the housing, characterized in that the self-ignition device is connected in a heat-conducting manner to the housing; the housing, only in a region adjacent to the self-ignition device, consists of a first material with a high thermal conductivity and the housing consists otherwise of a second material with a substantially lower thermal conductivity relative to that of the first material; and
a thermal insulation is arranged on an inner side of the housing in a region of the self-igniting device, said thermal insulation covering the housing region consisting of the first material with a high thermal conductivity and surrounding an end of the self-ignition device without shielding the gas-producing material relative to the self-ignition device.

2. A gas generator according to claim 1, characterized in that the thermal conductivity of the first material is equal to 10 times to 20 times that of the second material.

3. A gas generator according to claim 1, characterized in that the housing has a cylindrical outer tube, consisting of the second material, the front ends of which are closed by closure covers, at least one of which consists of the first material and in that the self-ignition device is secured to a closure cover.

4. A gas generator according to claim 3, characterized in that the self-ignition device has a substantially cylindrical housing body of heat-conducting material, which is arranged in a centrally arranged through-bore in the closure cover, and has a blind hole open to an inner chamber of the outer tube, in which there is accommodated a material which self-ignites at a fixed minimum temperature.

5. A gas generator according to claim 4, characterized in that the blind hole opening is formed as a restricted opening located at one end of the blind hole.

6. A gas generator according to claim 4, characterized in that the self-ignition device has, as well as the self-igniting material, a booster charge which is able to be ignited by the self-igniting material.

7. A gas generator according to claim 6, characterized in that the self-igniting material is arranged in a base region of the blind hole and the booster charge is applied to the self-igniting material, which charge is located between the self-igniting material and the blind hole opening.

8. A gas generator according to claim 6, characterized in that the self-igniting material and the booster charge in the blind hole comprises a homogeneous pressed body, which is covered, relative to the blind hole opening, by a foil.

9. A gas generator according to claim 4, characterized in that the housing body of the self-ignition device extends in an axial extent of the outer tube over and beyond the closure cover.

10. A gas generator according to claim 4, characterized in that the housing body of the self-ignition device consists of aluminum or of an aluminum alloy.

11. A gas generator according to claim 1, characterized in that the self-ignition device is connected to the housing by by a press fit.

12. A gas generator according to claim 1, characterized in that the self-ignition device is connected to the housing by a threaded connection.

13. A gas generator according to claim 1, characterized in that first material with a high thermal conductivity comprises aluminum or an aluminum alloy and the second material with a substantially lower thermal conductivity comprises high-grade steel.

* * * * *